(12) United States Patent
Tujkovic et al.

(10) Patent No.: US 8,116,388 B2
(45) Date of Patent: Feb. 14, 2012

(54) TIME DOMAIN INTERFERENCE AVERAGING WITH MULTIUSER DIVERSITY IN OFDMA SYSTEMS

(75) Inventors: Djordje Tujkovic, Santa Clara, CA (US); Arogyaswami Paulraj, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 883 days.

(21) Appl. No.: 11/454,656

(22) Filed: Jun. 16, 2006

(65) Prior Publication Data

US 2008/0002619 A1 Jan. 3, 2008

(51) Int. Cl.
*H04K 1/10* (2006.01)
*H04L 27/28* (2006.01)

(52) U.S. Cl. ...................................... 375/260
(58) Field of Classification Search .................. 375/214, 375/310, 322, 260, 267, 347, 130, 247, 249, 375/355, 357; 370/210, 338, 316, 203, 205, 370/208, 330, 350, 525; 455/74, 436, 522, 455/509, 513
See application file for complete search history.

(56) References Cited

U.S. PATENT DOCUMENTS

| | | | |
|---|---|---|---|
| 6,377,636 B1 | 4/2002 | Paulraj | |
| 6,657,949 B1 * | 12/2003 | Jones, et al. | 370/205 |
| 6,795,424 B1 | 9/2004 | Kapoor | |
| 2004/0095880 A1 * | 5/2004 | Laroia et al. | 370/208 |
| 2005/0043031 A1 * | 2/2005 | Cho et al. | 455/450 |
| 2005/0163258 A1 * | 7/2005 | Gore et al. | 375/340 |
| 2005/0220200 A1 * | 10/2005 | Giannakis et al. | 375/260 |
| 2005/0250469 A1 * | 11/2005 | Laroia et al. | 455/403 |
| 2006/0045001 A1 * | 3/2006 | Jalali | 370/208 |
| 2006/0098570 A1 * | 5/2006 | Hadad | 370/210 |
| 2008/0212695 A1 * | 9/2008 | Mo et al. | 375/260 |

OTHER PUBLICATIONS

Kim et al., Performance of an LDPC-Coded Frequency-Hopping OFDMA System Based on Resource Allocation in the Uplink, ETRI, Sep. 2003.
Li et al., A Novel Broadband Wireless OFDMA Scheme for Downlink in Cellular Communications, IEEE WCNC, vol. 3, pp. 1907-1911, Mar. 2003.
Je et al., A Novel Multiple Access Scheme for Uplink Cellular Systems, IEEE Vehicular Technology Conference, Sep. 2004.
Persson et al., Comparison of coded OFDMA and OFDM-CMDA in a frequency reuse one system, Jan. 2004.
Persson et al., Analysis of the Downlink BER Performance for Coded OFDMA with Fading Co-channel Interference, Chalmers, Sweden, Jan. 2004.

* cited by examiner

*Primary Examiner* — David C. Payne
*Assistant Examiner* — Syed Haider
(74) *Attorney, Agent, or Firm* — Sterne, Kessler, Goldstein & Fox P.L.L.C.

(57) ABSTRACT

Interference between multiple users operating under multiuser diversity within a coherence bandwidth in an OFDMA system is reduced by spreading out the users' transmission symbols randomly in time within the coherence bandwidth. When transmission symbols are randomly dispersed, the variance of interference between users in the same sub-band is reduced on average.

11 Claims, 6 Drawing Sheets

TIME DOMAIN INTERFERENCE AVERAGING WITH MULTIUSER DIVERSITY IN OFDMA SYSTEMS

TECHNICAL FIELD

The invention relates generally to digital communications. In particular it relates to interference averaging in orthogonal frequency-division multiple access (OFDMA) systems.

BACKGROUND

Wireless digital communications systems are poised to offer a cost-effective alternative to cable and DSL data services. So called "WiMAX" technology, based on the IEEE 802.16e air interface standard is a promising framework for broadband wireless applications. It has the potential to enable full internet and digital voice services for both fixed and mobile users.

The physical layer architecture for IEEE 802.16e OFDMA systems is based on orthogonal frequency-division multiplexing (OFDM) modulation. Since OFDM divides the total bandwidth into multiple narrowband sub-bands, the effects of frequency selective fading are reduced. The OFDM system allows for a simple receiver structure while maintaining high link quality. The technology also employs adaptive modulation and coding in both the downlink and the uplink to deal with variations in link quality. This enables WiMAX to offer multiple date rates at the physical layer which can be adapted dynamically based on the integrity of the air link.

Multiple users share the total system bandwidth by multiplexing their data in both time and frequency. In an adaptive OFDM system, spectral efficiency can be improved by allocating time—frequency resources based on throughput requirements, quality of service constraints and the channel qualities of each user. A scheduler, which optimizes resource allocation for multiple active users, becomes a key element in such a solution. In present code-division multiple access (CDMA) systems, spectral efficiency decreases with an increasing number of active users because of intra-sector interference due to imperfect orthogonality of the downlinks. In an adaptive OFDM system, where orthogonal time—frequency resources are given to the user who can utilize them best, the spectral efficiency instead increases with the number of active users. This effect is known as multiuser diversity.

Multiuser diversity, in which sub-bands are allocated to users with the highest channel gains, can be quite effective for low-mobility users. However, multiuser diversity mode is prone to errors due to the bursty nature of interference. This is a tradeoff of concentrating user transmissions within sub-bands. When an interferer's burst is in the same sub-band as that of a user, the user may experience a low signal-to-interference ratio on a large fraction of the tones in its burst.

However, within as little as one frame transmission time, the propagation channel conditions of an interferer can change dramatically and/or some other, less-detrimental interferer may be scheduled within the user's sub-band. Therefore users may suddenly experience a very high signal-to-interference ratio on all or almost all tones in a burst. These unpredictable, large changes between high and low signal-to-interference ratios are undesirable.

Despite the advantages of multiuser diversity that come from choosing the sub-band with highest channel gain, throughput often cannot be improved as extra redundancy needs to be added to transmissions to compensate for worst case interference. The above mentioned variability of interfering users' propagation channels can be attributed to many aspects of practical wireless communications systems, e.g., mobility of users in the system, the application of different antenna array signal processing algorithms at the transmit and receive ends of both base stations and subscriber units, the difference in scheduling requirements for direct (base to subscriber) and reverse (subscriber to base) links, partially loaded sectors, and non-continuous transmissions in data-like services.

What is needed is a method to reduce the variance of interference between users while retaining the benefits of multiuser diversity. Such a solution would enable WiMAX and other OFDMA digital communications systems to achieve better resistance to potential interference problems such as those associated with mobile users operating under multiuser diversity.

BRIEF DESCRIPTION OF THE DRAWINGS

The drawings are heuristic for clarity.

Detailed Description

In wireless digital communications, information is transmitted between base stations and users via radio signals that, in modern systems, lie approximately in the gigahertz frequency range. The information can include digitized voice signals or any other type of digital information such as email or web page data. Prior to being sent over a radio link, digital data is mapped onto complex transmission symbols. Here, "complex", means containing real and imaginary parts, or both amplitude and phase components.

In an orthogonal frequency-division multiplexed (equivalently: orthogonal frequency-division multiple access, OFDMA) digital communications system, the range of frequencies over which symbols are transmitted, i.e. the total system bandwidth, is divided into many sub-bands which are further divided into bins. Individual symbols are sent by modulating tones within each bin. The amount of time over which tones are modulated to send a symbol is a single time slot. Several time slots make up a burst of symbols and a long burst forms a frame.

As an example only, an OFDMA system might use a total system bandwidth of 10 MHz. 0.78 MHz on each side is reserved for so-called "guard bands" in which no transmission is allowed. The center 8.44 MHz is divided into 12 sub-bands, each of which is divided into 8 bins. Each bin is further divided into 9 tones. Therefore, in this example, there are a total of 864 tones available for time-frequency allocation. The cardinality of the set of complex symbols that are used to modulate each tone could be 2, 4, 8, 16 or 64 (corresponding to 1 to 6 bits of information). The symbol transmission time might be around 100 microseconds with a burst containing anywhere from 1 to about 50 symbols and a frame containing about 50 or more symbols. These example numbers are meant only to convey a sense of typical OFDMA parameters; actual systems may vary from this example.

In an OFDMA system the number of tones available in a given period of time determines the maximum information carrying capacity of the system. If, at a given time, all tones are being modulated with symbols, then the maximum amount of information that can be transmitted is being transmitted. A tone modulated for one symbol transmission time is a convenient unit of data transmission capacity or resources available in the system.

In real world communications, problems, such as noise, fading, interference, and multiple users wanting to use a system at the same time, make it impossible to ensure that all symbols are sent with perfect fidelity. Error-correcting coding schemes are used to ensure that data is transmitted correctly even when some symbols fail to get through. However, the spectral efficiency of an OFDMA system can be improved by an adaptive scheme to allocate time—frequency resources.

Dynamic resource allocation provides improvements in spectral efficiency by taking advantage of channel variations and user diversity. Channel state information is used to schedule users. The method for obtaining channel state information at the transmitter depends on the system architecture. For example in some systems receivers estimate channel state information based on their reception of a common pilot tone and feed the information back to the transmitter. In systems employing time-division duplexing, channel reciprocity allows the transmitter to use the channel state information estimated during reception for transmission. In practical time-division duplexing systems, amplitude information can be estimated from the opposite link, while it is more difficult to obtain accurate phase information due to difficulty in calibrating the difference in phase response between the transmitter and receiver chains.

When channel state information is available at the transmitter, multiuser diversity can be used as an allocation strategy for maximizing the total data rate of an OFDMA system. Multiuser diversity involves scheduling at any one time the user which can make the best use of the channel, i.e. the user with the best channel response or SNR. Multiuser diversity yields an increase in the total throughput as a function of the number of users.

Conventional multiuser diversity can suffer from bursty, high variance interference. This is a tradeoff of concentrating user transmissions within sub-bands. Whenever a dominant interferer's burst is concentrated in the same sub-band as that of a user, the user may experience a low signal-to-interference ratio on a large fraction of the tones in its burst.

However, within as little as one frame transmission time, the propagation channel conditions of a dominant interferer can change dramatically and/or some other, less-detrimental interferer can be scheduled within the selected preferred sub-band. Therefore users may suddenly experience a very high signal-to-interference ratio on all or almost all tones in a burst. This unpredictable change between high and low signal-to-interference ratios is undesirable.

Figure 1:
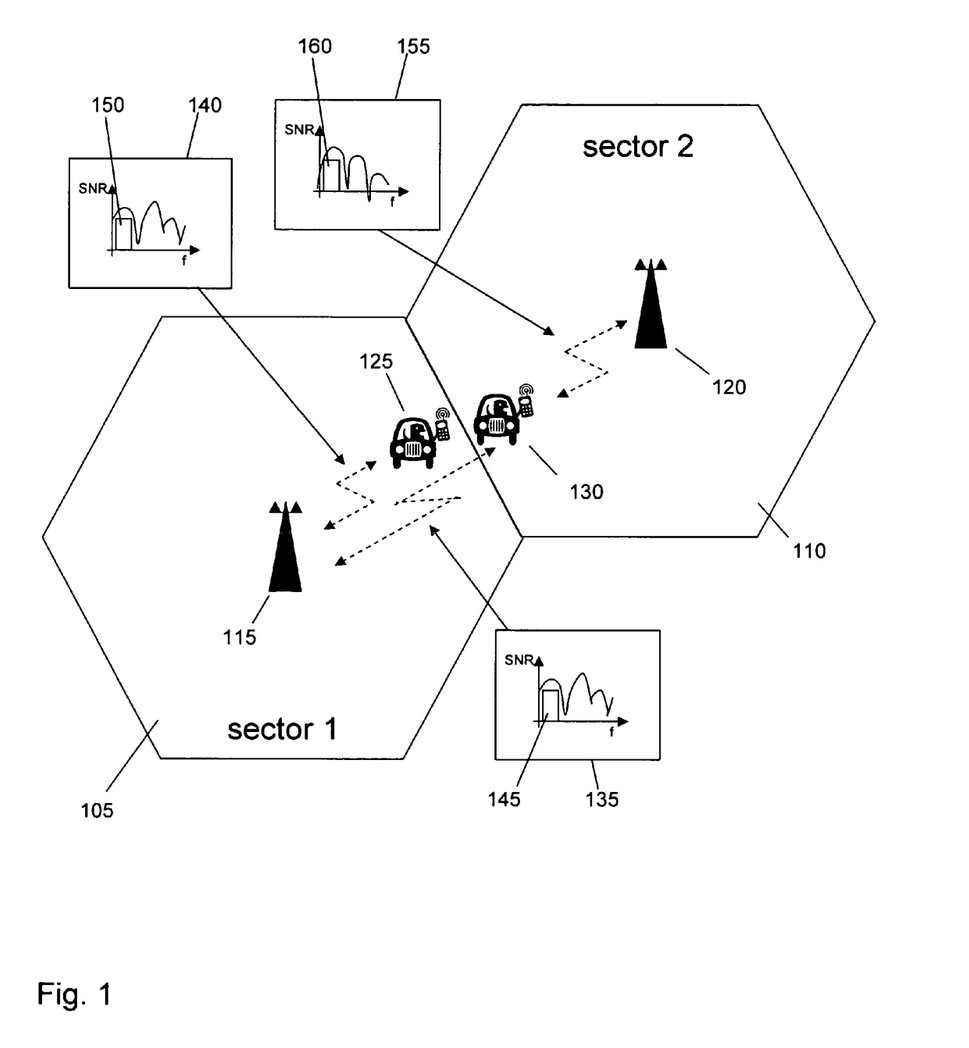
FIG. 1 shows mobile users operating in sectors of a digital communications system.

FIG. 1 shows mobile users operating in sectors of a digital communications system. A first sector 105 contains base station or tower 115 and mobile user 125. A second sector 110 contains base station or tower 120 and mobile user 130. Jagged, dotted arrows indicate propagation channels between user 125 and tower 115, between user 130 and tower 120, and also between user 130 and tower 115. Graphs of the signal-to-noise ratios (SNR) for these channels are provided as graphs 140, 155, and 135, respectively. The graphs further show, as items 150, 160 and 145 sub-bands in use in the channels.

In a multiuser diversity frequency allocation scheme users are assigned sub-bands which offer them the best signal propagation characteristics; e.g. the best SNR. Within a particular sector of a communications system users are either assigned different sub-bands or different burst times within the same sub-band to prevent interference. However, when users in different sectors are located near each other, as illustrated schematically in FIG. 1, they may try to communicate with their respective base stations at the same time and in the same sub-band. This results in interference which is highly variable in amplitude.

In FIG. 1 user 130 is in communication with tower 120 while user 125 is in communication with tower 115. However, the propagation channel between user 130 and tower 115 also has, at least temporarily, high SNR as indicated in graph 135. Therefore user 125 is likely to experience strong interference from user 130 in the sub-band indicated by 150 in graph 140 which is the same as sub-band 145 in graph 135. As user 130 moves around the propagation channel between him and tower 115 may change suddenly, and therefore the amount of interference caused to user 125 may also change suddenly.

Rapid and unpredictable variation in interference is problematic for digital communications systems. The variation can come from many sources such as: (1) the movement of mobile users in the system, (2) the application of different antenna array signal processing algorithms in the transmitters and receivers of both base stations and users, (3) the difference in scheduling requirements for direct (base to user) and reverse (user to base) links, (4) partially loaded cells, and (5) non-continuous transmissions in data-like services.

Interference between users within a preferred coherence bandwidth can be reduced by spreading out the users' transmission symbols randomly in time within the coherence bandwidth. When transmission symbols are dispersed randomly in time, the variance of interference between users' bursts in the same sub-band is reduced on average.

Figure 2:
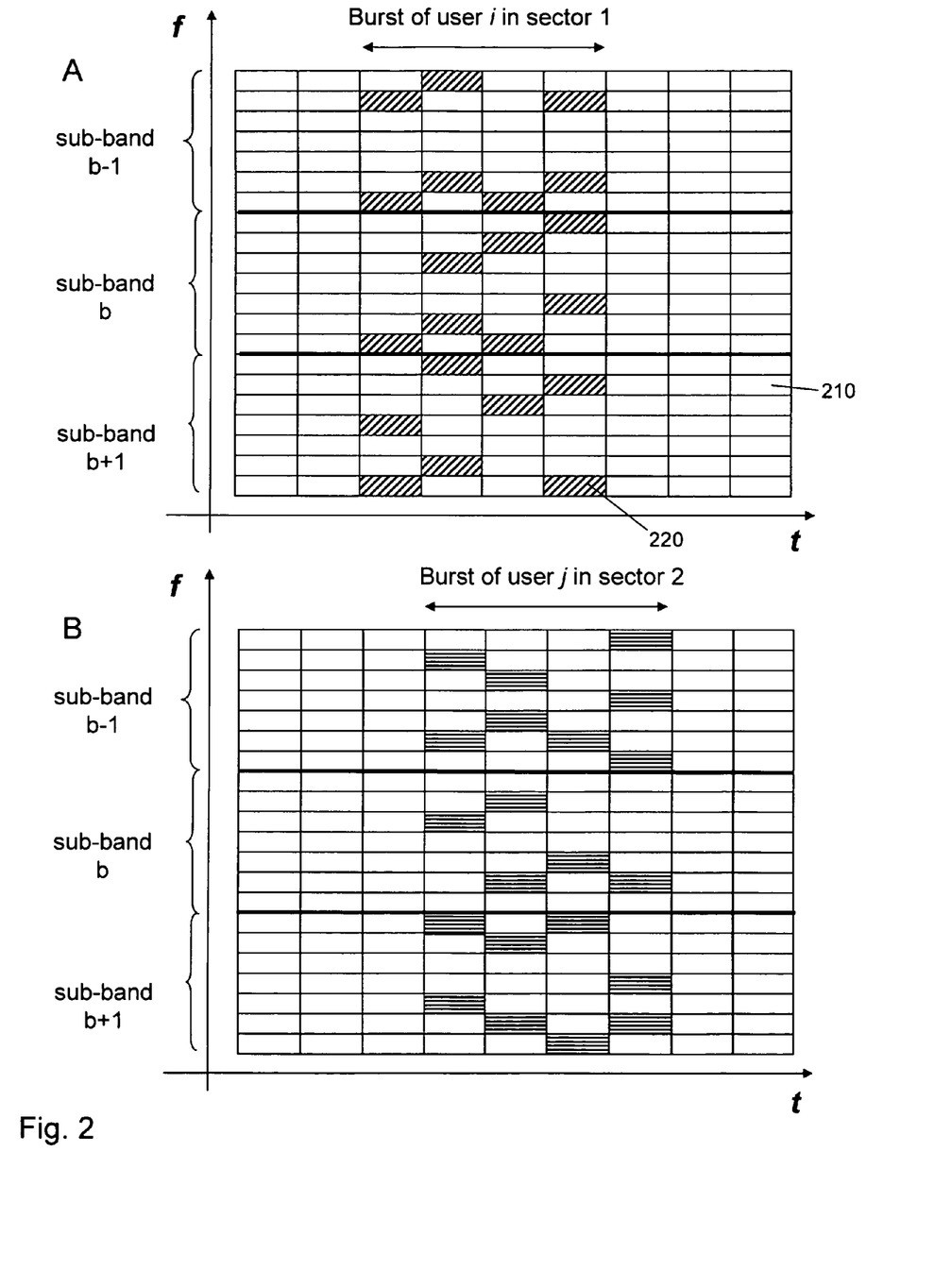
FIGS. 2A & 2B show examples of tone assignments in a frequency diversity allocation scheme.
Figure 3:
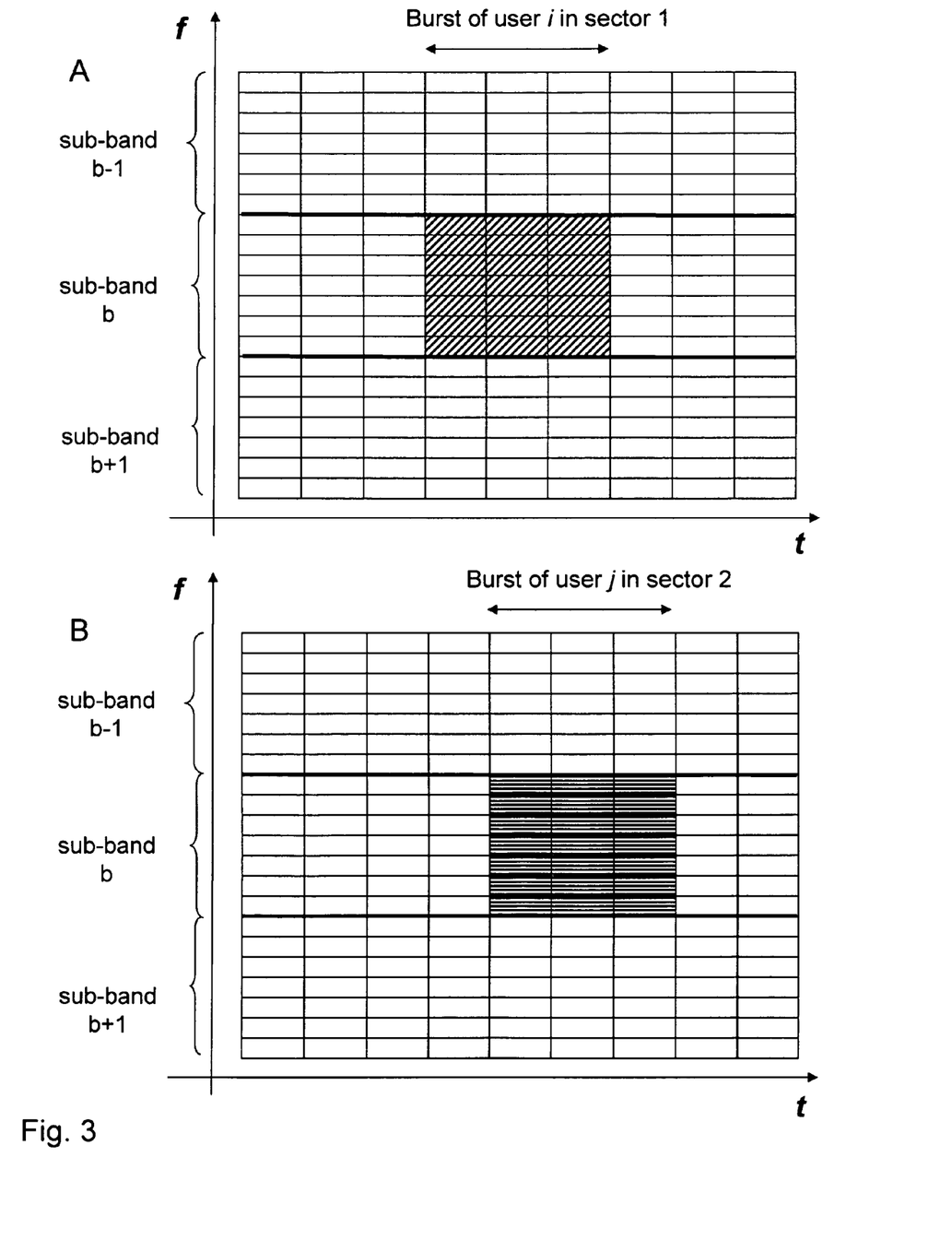
FIGS. 3A & 3B show examples of tone assignments in a multiuser frequency allocation scheme.
Figure 4:
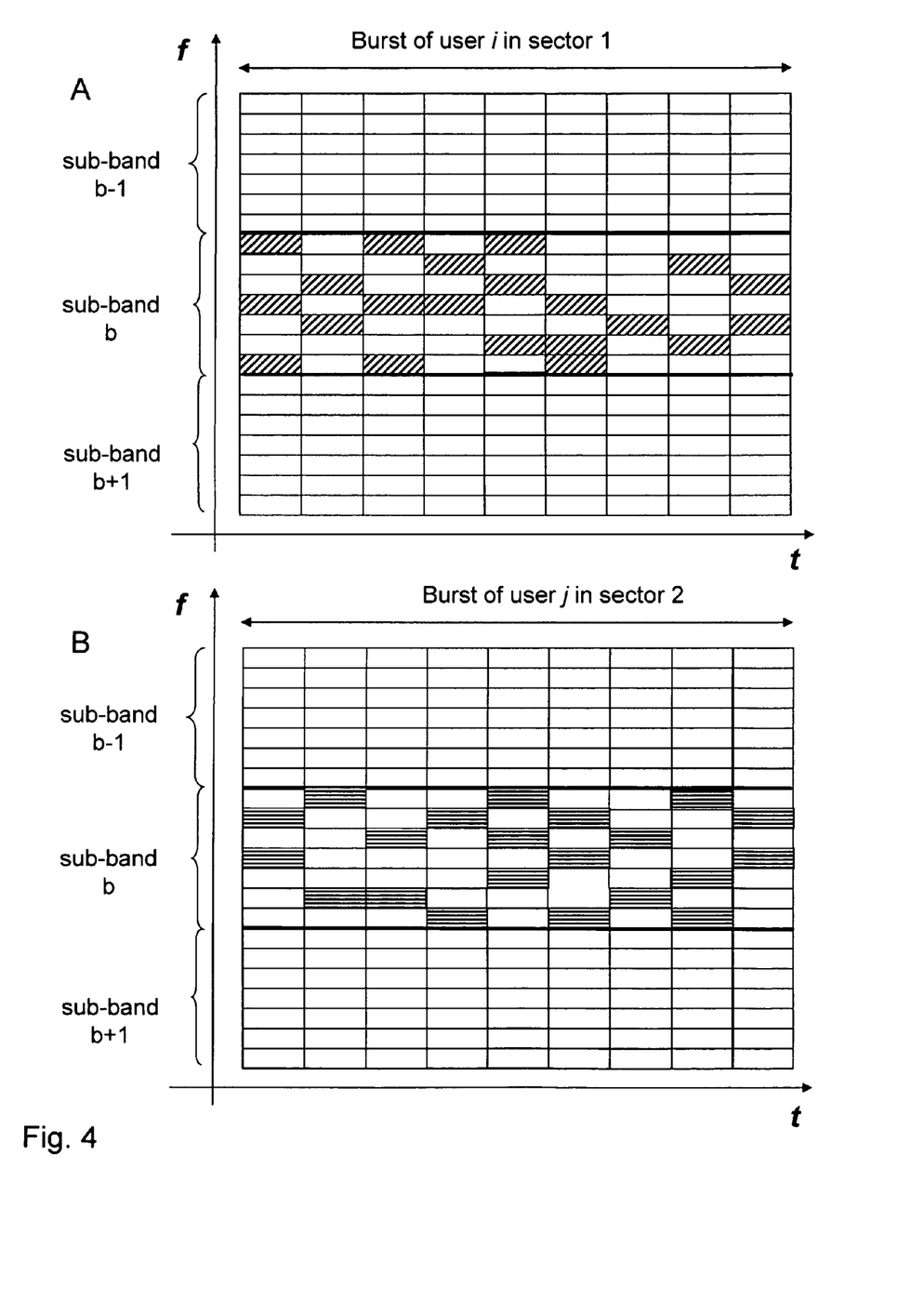
FIGS. 4A & 4B show examples of tone assignments in a multiuser frequency allocation scheme with time domain interference averaging.

In modern digital communications systems with adaptive resource allocation a scheduler assigns spectral resources to users. FIGS. 2, 3 and 4 illustrate three example spectral tone assignment schemes for frequency diversity, multiuser diversity, and multiuser diversity with interference averaging, respectively. Multiuser diversity is preferable to frequency diversity when channel state information is available at the transmitter. Multiuser diversity with interference averaging represents a further improvement in that the advantages of multiuser diversity are combined with the interference reduction available through interference averaging.

FIGS. 2A & 2B show examples of tone assignments in a frequency diversity allocation scheme. This scheme avoids the problems of multiuser diversity just mentioned, but has other undesirable features. FIGS. 2A & 2B are schematic graphs of time—frequency resources, grouped into sub-bands "b−1" "b", and "b+1". Tones available during a time slot are indicated by rectangular areas such as 210. Tones used by a user are filled in; see, e.g. area 220 which represents a tone in use by user i in sector 1. Bursts lasting several symbol times are labeled at the top of each graph. In FIG. 2A the duration of a burst of user i in sector 1 is indicated by a double-ended arrow at the top of the graph. Similarly, a burst of user j in sector 2 is indicated by a double-ended arrow at the top of the graph in FIG. 2B.

In frequency diversity, tones are randomly assigned to different users across all frequency sub-bands in the system. This means that there is little or no overlap between the set of tones assigned to any two users and therefore interference is reduced. Frequency diversity may be the best solution when no channel state information is available at the transmitter.

However, if channel state information is available, it is more efficient to use multiuser diversity.

It is apparent by superposition of FIGS. 2A and 2B that the tones of user i in sector 1 and user j in sector 2 overlap only occasionally. Therefore interference between the two users is small. Furthermore, while the two users may interfere with each other, the magnitude of the interference will not vary greatly over time, especially when compared to the multiuser diversity scenario discussed next.

FIGS. 3A & 3B show examples of tone assignments in a multiuser frequency allocation scheme. Similar to FIGS. 2A & 2B, FIGS. 3A & 3B are schematic graphs of time—frequency resources, grouped into sub-bands "b−1" "b", and "b+1". Tones are depicted as rectangular areas; hatched areas are tones in use by a user. Burst times lasting several symbols are indicated by double-ended arrows.

User i in sector 1 has been assigned sub-band "b" and a burst time as indicated in FIG. 3A. User j in sector 2 has been assigned the same sub-band "b"and an overlapping burst time as indicated in FIG. 3B. It is apparent by superposition of FIGS. 3A and 3B that during the two symbol times that tones within sub-band "b" are in use by both user i and user j, interference between the two users will result. Furthermore this interference will vary rapidly from practically nothing when the two bursts do not overlap to substantially complete interference when the bursts do overlap. This is high variance, "bursty" interference.

FIGS. 4A & 4B show examples of tone assignments in a multiuser frequency allocation scheme with time domain interference averaging. Similar to FIGS. 2A, 2B, 3A and 3B, FIGS. 4A & 4B are schematic graphs of time—frequency resources, grouped into sub-bands "b−1", "b", and "b+1". Tones are depicted as rectangular areas; hatched areas are tones in use by a user. Burst times lasting several symbols are indicated by double-ended arrows. In each of FIGS. 2A, 2B, 3A, 3B, 4A and 4B, tones that are not shown as being in use by either user i in sector 1 or user j in sector 2 are available for use by other users.

In FIGS. 4A & 4B users i and j (located in sectors 1 and 2 respectively) have been assigned the same sub-band "b" in which they experience high SNR. However, in contrast to the situation illustrated in FIGS. 3A & 3B, in FIGS. 4A & 4B, the tones of each user have been spread out into longer bursts. Transmission symbols have been assigned to tones within the burst on a pseudorandom basis. Many of the tones are left unused. There is a high probability that most of the time tones used by user i will not overlap with, and therefore will not interfere with, tones used by user j. From time to time tones of users i and j do overlap and interfere with each other, but the magnitude of the interference does not vary greatly over time. At the same time users i and j still operate within their preferred sub-band and thereby obtain the benefits of multiuser diversity. This is the basis of time domain interference averaging in a multiuser diversity OFDMA system.

When users operating in a multiuser diversity frequency allocation scheme are assigned to the same sub-band, interference is reduced if transmission symbols are assigned to the users pseudorandomly within a burst. This technique works even when users in close proximity are communicating with different base stations that do not directly communicate with each other. However if base stations in a network are able to communicate, then even greater interference reduction can be achieved.

When base stations are able to coordinate amongst themselves it becomes possible to improve upon pseudorandom tone assignment. For example, consider separate base stations communicating with users near the boundary between two sectors (see, e.g. FIG. 1). The base stations can operate in several possible modes, for example: frequency diversity (see, e.g. FIG. 2); multiuser diversity without interference averaging (see, e.g. FIG. 3); multiuser diversity with pseudo-random interference averaging (see, e.g. FIG. 4); or, multiuser diversity with orthogonal time interleaving.

Multiuser diversity with orthogonal time interleaving means that rather than tones being distributed in a sub-band pseudorandomly within a burst, the tones are assigned in a pattern that is orthogonal to a tone assignment pattern used by another user. Base stations that can coordinate tone assignment patterns can ensure that users sharing a sub-band use orthogonal patterns that do not interfere with one another.

Figure 5:
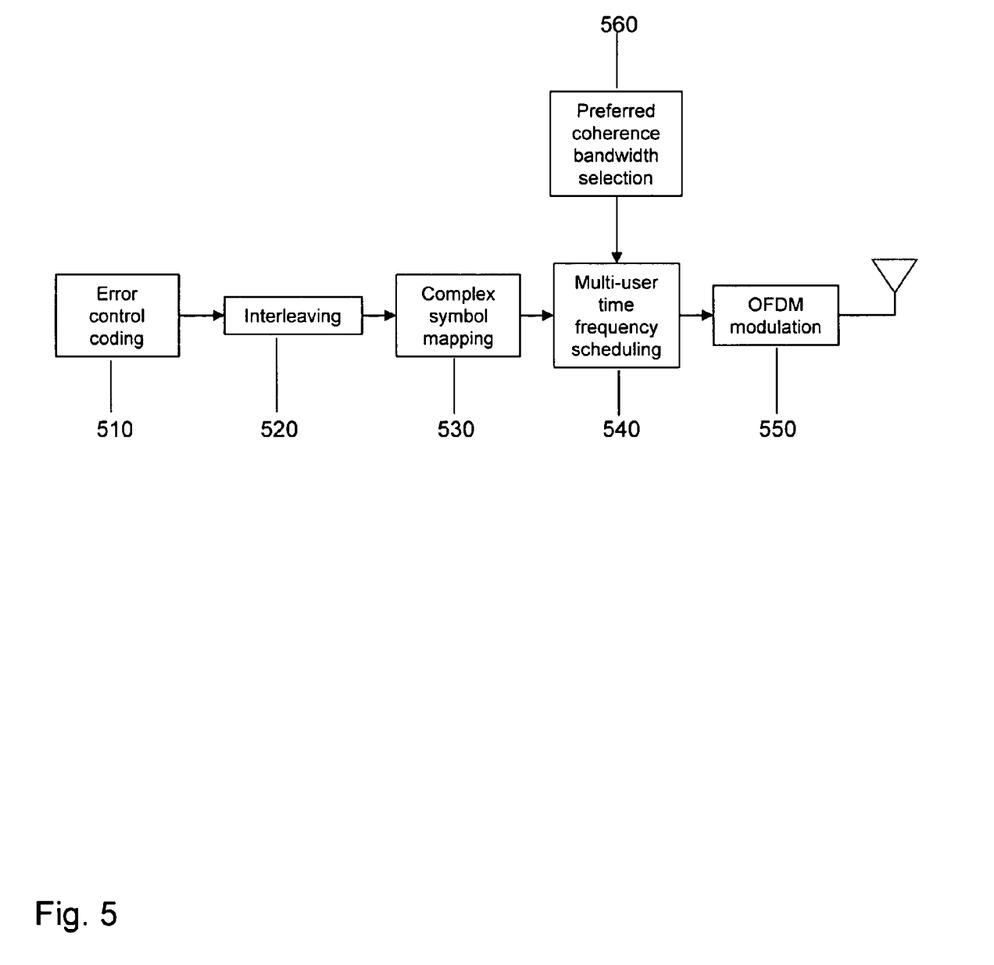
FIG. 5 shows a system block diagram for a transmitter incorporating time domain interference averaging.

FIG. 5 shows a system block diagram for a transmitter incorporating time domain interference averaging in a multiuser—diversity frequency allocation scheme. In the figure, block 510 represents part of the system where data is encoded in an error control coding scheme. Error control coding prevents data loss even when symbols are dropped or received incorrectly at a receiver. Block 520, interleaving, is the part of the system in which encoded bits are interleaved so that complex symbols modulate non-consecutive bits from the encoded data stream. Complex symbol mapping, block 530, is the part of the system in which data is assigned to complex transmission symbols. Block 540, multiuser time—frequency scheduling is the part of the system that assigns complex transmission symbols to tones for wireless transmission. Preferred coherence bandwidth selection block 560, is the part of the system that assigns preferred sub-bands to users. The multiuser time—frequency scheduling block 540 uses information from block 560 to assign tones in an interference averaging scheme as described above especially in connection with FIG. 4. Finally, complex symbols modulate tones in OFDM modulation block 550.

Figure 6:
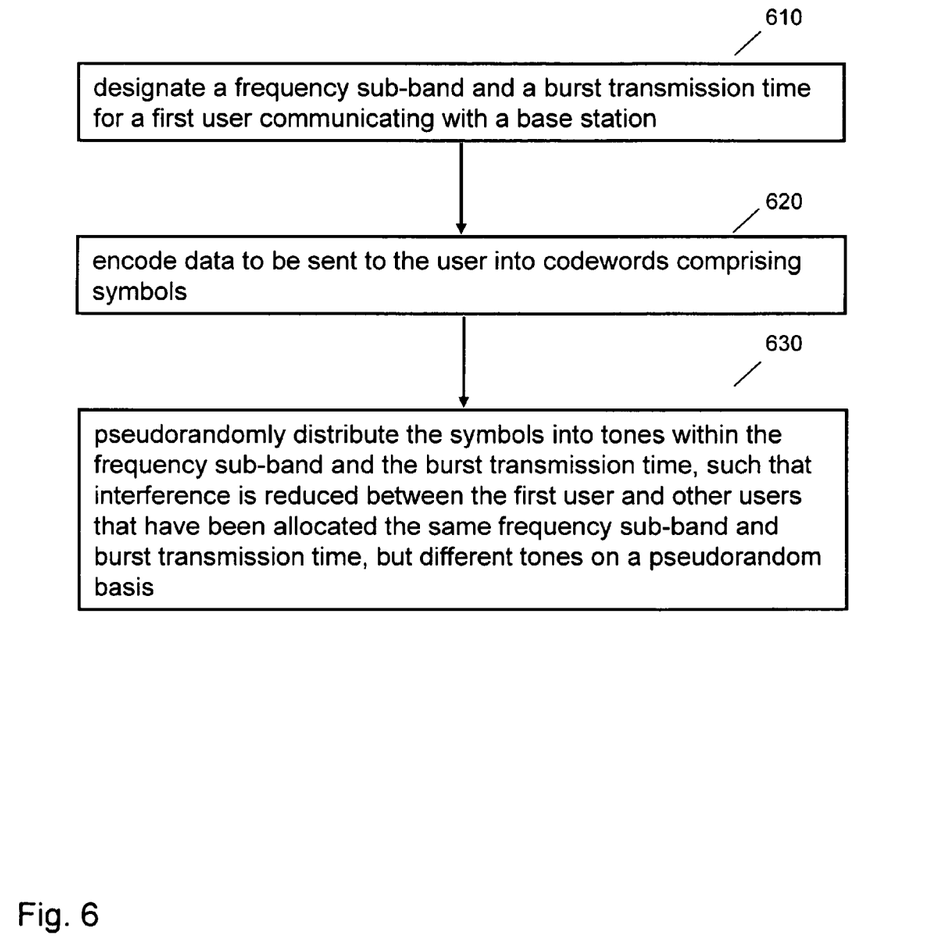
FIG. 6 shows a flow chart for implementing an interference averaging, multiuser frequency allocation scheme.

FIG. 6 shows a flow chart for implementing a multiuser—diversity frequency allocation scheme with interference averaging. The flow chart outlines major steps in a method for implementing interference averaging in multiuser—diversity frequency allocation. In step 610 a frequency sub-band and a burst transmission time for a first user communicating with a base station are designated. In step 620 data to be sent to the user is encoded in codewords comprising symbols. In step 630 the symbols are pseudorandomly distributed into tones within the frequency sub-band and the burst transmission time, such that interference is reduced between the first user and other users that have been allocated the same frequency sub-band and burst transmission time, but different tones on a pseudorandom basis. Here assigning different tones on a pseudorandom basis includes the possibility that from time to time the same tone is assigned to more than one user.

The communication systems and methods described above include a method for wireless data transmission comprising designating a frequency sub-band and a burst transmission time for a first user communicating with a base station. The method of an embodiment includes encoding data to be sent to the user into codewords comprising symbols. The method of an embodiment includes pseudorandomly distributing the symbols into tones within the frequency sub-band and the burst transmission time, such that the variance of interference is reduced between the first user and other users that have been allocated the same frequency sub-band and burst transmission time, but different tones on a pseudorandom basis.

The communication systems and methods described above include a system for wireless data communication. The system of an embodiment comprises an interleaving unit. The system of an embodiment comprises a symbol mapper coupled to the interleaving unit. The system of an embodiment comprises a scheduling unit coupled to the symbol mapper and configured to operate with preferred coherence bandwidth information to schedule tones for symbol transmission within a preferred coherence sub-band.

The system of an embodiment comprises a coding unit coupled to the interleaving unit. The coding unit of an embodiment is configured to encode data using one or more error control coding schemes.

The symbol mapper of an embodiment is configured to assign received data to one or more complex transmission symbols.

The scheduling of tones of an embodiment includes pseudorandom scheduling.

The scheduling unit of an embodiment is configured to assign transmission symbols to the tones. The transmission symbols of an embodiment are associated with communications data of a plurality of users.

The system of an embodiment being configured to assign transmission symbols to the tones includes use of information of one or more sub-bands assigned to each of a plurality of users.

The system of an embodiment includes a bandwidth selection device coupled to the scheduling unit. The bandwidth selection device of an embodiment is configured to assigned one or more sub-bands to each of a plurality of users.

The communication systems and methods described above include a method for wireless data transmission comprising, in a digital communications system, pseudorandomly allocating tones within a frequency sub-band and a burst transmission time that is being used by more than one user simultaneously, such that the variance of interference between multiple users of the system is reduced on average.

The frequency sub-band of an embodiment is assigned to the more than one user simultaneously as a result of conflicts between multiuser diversity modes of two different base stations.

As one skilled in the art will readily appreciate from the disclosure of the embodiments herein, processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

In general, in the following claims, the terms used should not be construed to limit the systems and methods to the specific embodiments disclosed in the specification and the claims, but should be construed to include all systems that operate under the claims. Accordingly, the systems and methods are not limited by the disclosure, but instead the scope of the systems and methods are to be determined entirely by the claims.

What is claimed is:

1. A method for data transmission in a wireless communication system comprising:
   selecting a sub-band corresponding to a portion of a total bandwidth of the wireless communication system based on a quality of a channel used to communicate with a device, wherein the sub-band comprises a plurality of tones;
   encoding data into codewords comprising symbols for transmission to the device; and
   pseudo randomly distributing the symbols across the tones and across a burst transmission time,
   wherein a number of symbols pseudo randomly distributed across the tones for a given time slot in the burst transmission time is less than a number of tones in the sub-band,
   wherein the given time slot corresponds to an amount of time over which a tone is modulated by a single symbol.

2. An apparatus for data communication in a wireless communication system comprising:
   an interleaving unit configured to interleave bits of a data stream;
   a symbol mapper configured to assign groups of non-consecutive bits of the data stream, provided by the interleaving unit, to symbols; and
   a scheduling unit configured to pseudo randomly distribute the symbols across tones of a sub-band, corresponding to a portion of a total bandwidth of the wireless communication system, and across a burst transmission time,
   wherein a number of symbols pseudo randomly distributed across the tones for a given time slot in the burst transmission time is less than a number of tones in the sub-band,
   wherein the given time slot corresponds to an amount of time over which a tone is modulated by a single symbol.

3. The apparatus of claim 2, further comprising a coding unit configured to encode the bits of the data stream using one or more error coding schemes.

4. The apparatus of claim 2, wherein the symbol mapper is configured to assign the groups of non-consecutive bits of the data stream to one or more complex symbols.

5. The apparatus of claim 2, further comprising a bandwidth selection device coupled to the scheduling unit, the bandwidth selection device configured to select the sub-band based on a quality of a channel used to communicate with a device.

6. A method for data transmission in a wireless communication system comprising:
   pseudo randomly distributing symbols across tones within a sub-band that is being used by a plurality of devices and across a burst transmission time such that a variance of interference between the plurality of devices is reduced;
   wherein a number of symbols pseudo randomly distributed across the tones for a given time slot in the burst transmission time is less than a number of tones in the sub-band,
   wherein the given time slot corresponds to an amount of time over which a tone is modulated by a single symbol.

7. The method of claim 6, wherein the sub-band is used by the plurality of devices as a result of conflicts between multiuser diversity modes of two different base stations.

8. The method of claim 6, wherein at least two of the plurality of devices are associated with different sectors of the wireless communication system.

9. The method of claim 6, wherein the plurality of devices are mobile devices.

10. The method of claim 6, wherein the plurality of devices are basestations.

11. The method of claim 1, wherein the device is a mobile device.

* * * * *